March 24, 1970  D. M. ALLEN  3,501,899
CONSTANT-FLOW AIR SAMPLER

Filed May 2, 1968  2 Sheets-Sheet 1

INVENTOR.
DONALD M. ALLEN
BY
Lippincott, Ralk & Henderson
ATTORNEYS

March 24, 1970 D. M. ALLEN 3,501,899
CONSTANT-FLOW AIR SAMPLER
Filed May 2, 1968 2 Sheets-Sheet 2

INVENTOR.
DONALD M. ALLEN
BY
Lippincott, Ralls & Henderson
ATTORNEYS

United States Patent Office 3,501,899
Patented Mar. 24, 1970

3,501,899
CONSTANT-FLOW AIR SAMPLER
Donald M. Allen, Richmond, Calif., assignor to International Chemical & Nuclear Corporation, Burbank, Calif., a corporation of California
Filed May 2, 1968, Ser. No. 726,078
Int. Cl. B01d 39/00, 46/46; F04b 49/00
U.S. Cl. 55—210                                        3 Claims

ABSTRACT OF THE DISCLOSURE

A filter apparatus including a variable speed pump and a valve interposed between a pressure sensitive switch which actuates the pump and the pump outlet and being responsive to the pump motor.

Background of invention

Various situations require a constant flow of fluid such as air or gas, and an example of such a requirement is found in the testing or monitoring of air for contaminants. In order to determine the percentage of contaminants in air, it is conventional to utilize a constant-flow system with an air sampler to prevent any variations in the volume of flow, as they would cause erroneous determinations of percentage contamination.

It is recognized that the establishment of a constant flow of air, or the like, involves not only the basic problem of preventing variations in operation of the air-flow generator, but, also, of compensating for varying resistance to air flow as may be introduced, for example, by a filter in the system. This problem has been recognized in the art and at least certain systems have been devised to overcome the problems presented thereby. One example of such a system is to be found in U.S. Patent No. 2,819,774 to Schmidt et al.

It is conventional in systems requiring a constant flow of air that specifications be established as to the percentage variations in air flow permissible. While these specifications have been apparently met by prior art systems, it has now been determined that at least under certain operating conditions the percentage variation in air flow is actually far more than previously suspected. Conventional systems apparently fulfilling specifications calling for a maximum air-flow variation of 2 percent actually regulate air flow only within 8 to 10 percent in many instances. The foregoing has been found to result from failure of the prior art to consider one of the inherent variable in constant air flow systems.

One manner of maintaining a constant output flow of air from a system having a filter, for example, therein is to increase the speed of a blower, or the like, employed in the system to compensate for the increasing resistance to air flow as the filter becomes progressively clogged. Such a system might be controlled by discharge pressure, as a convenient manner of operation. While this is apparently a relatively straightforward solution to the problem involved, it is presented herein that such a system introduces its own error into the requisite regulation or control. As a blower, or pump, is sped up or more heavily loaded, there result air losses therein which are converted into heat which raises the temperature of exhaust air. Consequently, employing the pressure of discharged air as a control does not in itself produce a constant air flow with reference to a constant temperature. The discharge pressure, because of increased temperature of air, is slightly higher than it would be if the air temperature had not been increased. The present invention provides a constant air flow system overcoming these noted problems.

Summary of invention

The present invention provides a constant air flow system which not only automatically compensates for varying resistance to air flow in a system, but, also, automatically corrects such compensation to constant temperature conditions. In accordance with this invention, the foregoing is accomplished without the utilization of temperature-sensing means and the complicated and delicate equipment normally associated therewith.

This invention incorporates control over means compensating for varying resistance in an air flow system to provide an additional increment of compensation related to heat losses in the system, as produced by the original compensation. As an example of the foregoing, a conventional blower may be speeded up to compensate for added resistance in an air-flow path, so as to achieve a substantially constant air flow therethrough. Such increased speed of the blower, however, is accompanied by air loss therein which is converted into heat thereby raising the temperature of the flowing air. Such increased temperature is normally sensed as an increased pressure. Thus, utilization of the pressure of such air at increased temperature for control purposes fails to produce a truly constant volume air flow, as measured at a constant temperature. This invention introduces an additional degree of compensation which may, for example, be dependent upon the speed of the blower.

The present invention employs discharge pressure as a basis for control in a constant air flow system. The effect of this discharge pressure is, however, herein modified in proportion to some other variable in the system. This other variable may, for example, be the blower speed as noted above, or, alternatively, may be the blower inlet pressure, as another example. It, however, is basic to the present invention that there shall be provided an additional degree or increment of compensation proportional to increase in air temperature necessarily resulting from the system as a whole operating under conditions of increasing resistance to air flow.

Description of figures

The present invention is illustrated as to particular preferred embodiments thereof in the following drawings wherein.

Description of preferred embodiments

Figure 1:
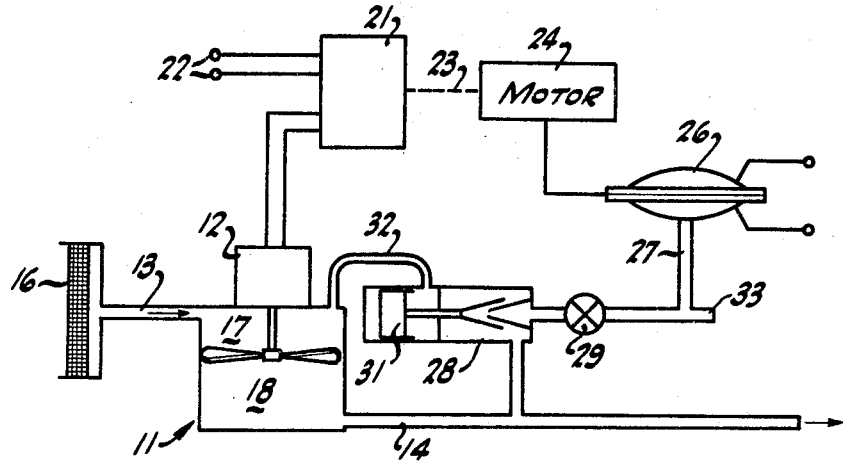
FIGURE 1 is a schematic illustration of a compensated constant-flow system in accordance with the present invention.

Inasmuch as the present invention admits of certain variations in system composition, there are illustrated and described herein a number of alternative embodiments of the invention. One such embodiment of the system hereof is illustrated in FIGURE 1 and referring thereto, there will be seen to be schematically illustrated an air pump, or blower, 11 driven by an electric motor 12 and having an inlet line 13 and outlet line 14. This pump 11 is adapted to move a fluid such as air and may, for example, comprise a positive displacement pump, a centrifugal pump or any other of a wide variety of known types of pumps. In general practice, it is common to employ some type of pump having an impeller, and, consequently, hereinafter termed a blower. This blower 11 will be seen to have the inlet, or suction, line 13 connected to a filter 16 that may be open to the atmosphere, so that the blower then draws air through the filter and inlet line into a vacuum chamber 17 of the pump. The blower, or pump, operates to forceably draw fluid such as air into the low-pressure, or vacuum, chamber 17 and to force such air into the outlet, or pressure, chamber 18 from whence the outlet line 14 extends.

It will be appreciated that in normal blower systems having a protective filter across the inlet thereof some variation in air flow into the blower is to be expected by the varying resistance of the filter. By the very nature of a filter, it is intended that same shall remove particles from air, or the like, passing therethrough. Consequently, as the filter collects particles, the resistance to air flow therethrough increases, and the same amount of suction applied by a pump or blower to the filter would then cause a decreasing amount of air to flow through the filter. The present invention operates to correct this variation in air flow, as through a filter, in the manner set forth below.

As noted above, the blower 11 is operated by a motor 12 which in this embodiment of the invention is taken as a variable speed motor. Such motor is energized through a variable transformer, or the like, 21, connected to suitable power-supply terminals 22. This unit 21 provides a variable-speed control for the blower motor 12, and may, for example, be in turn controlled by control shaft 23 thereof coupled to a reversible control motor 24. The present invention provides for operating this reversible motor 24 from a pressure-sensing switch 26 which may be wholly conventional in having make-and-break contacts for energizing the motor 24 to turn in either direction, in accordance with pressure in an inlet line 27 of the switch. In order to achieve a truly constant air flow across the filter, the present invention incorporates a valve unit 28 having an inlet from the blower outlet line 14 and an outlet connected through a manual control valve 29 to the switch inlet 27. This valve 28 provides a variable pressure drop thereacross which is controlled in accordance with the system of this invention by the inlet pressure of the blower, or pump, 11. Such is herein accomplished by the provision of a vacuum-operated piston 31 in the valve 28 and a vacuum line 32 extending from the bottom of this piston to the vacuum chamber 17 in the blower. Movement of the valve piston 31 operates to vary the restriction to air flow through the valve, i.e., it varies the valve opening, inasmuch as the present invention operates upon pressure variations occurring during flow, there is also provided a small bleed-off connection 33 exhausting to the atmosphere from the switch inlet line 27.

Considering now operation of the system illustrated in FIGURE 1 and described immediately above, it is noted that upon energization of the blower, or pump, motor 12 from the power-supply terminals 22 through the control unit, or variable transformer, 21, the pump 11 will operate to draw air into the filter 16 and discharge air through the outlet line 14. Again, as noted above, clogging of the filter 16 will vary the resistance to air flow therethrough; consequently, constant-speed operation of a pump, or blower, will then result in a lesser air flow in the discharge line 14. In accordance with this invention, however, a small portion of the discharge air passes through the valve 28 to the pressure switch 26. With appropriate setting of this switch, it will remain in neutral condition for a predetermined discharge pressure in the line 14. Decrease in the discharge pressure will cause variation in pressure applied to the pressure-sensitive switch 26, so as to close one of the contacts therein for operating the control motor 24 that, in turn, varies the setting of the variable transformer 21 to change energization of the blower motor 12. It will be appreciated that this operation, as described immediately above, will result in the attainment of an equilibrium condition apparently producing a constant flow of air in the discharge line 14. In actuality, however, an important additional variable is present. As the blower motor 12 has the energization thereof increased to increase the speed of blower operation, there will result an air loss in the blower itself. This, alone, would appear not to influence the regulation attained, inasmuch as it is the discharged air that controls blower speed. Further consideration, however, shows that this air loss appears as heat in the air pumped, or moved, by the blower 11. Consequently, the air discharged from the blower operating at an increased speed will have a higher temperature than it would if the blower were operating at a lower speed. It is readily recognized that raising the temperature of the discharge air increases the pressure thereof, so that actually a lesser volume of discharge air will cause the same pressure control, or regulation, in the system. Consequently, regulation or control over the volume of air discharged is in error because of the increased temperature of such air. This is compensated for, in accordance with the present invention, by the variable pressure drop induced by the valve 28 in the regulating system. A reduction in pressure in the inlet chamber 17 of the blower, as may be caused by increased clogging of the filter 16, reduces the pressure applied below the piston 31 of the valve 28 and, consequently, closes this valve slightly so as to increase the pressure drop therethrough. It is, of course, to be appreciated that the physical structure of the valve 28 may be varied within the limitation that control over the pressure drop therethrough, or opening therethrough, is attainable by an appropriately applied vacuum. Suitable mechanical means for this purpose are known in the art: for example, the piston 31 may be spring loaded and appropriately controlled as to degree of movement and response to any desired variation in controlled vacuum. This control of the pressure drop through the valve 28 provides a compensating correction to the pressure applied to the switch 26. In actual practice, the temperature of discharge air slowly rises, so that the valve 28 is slowly controlled to vary the pressure drop therethrough; consequently, the switch 26 is slowly or intermittently activated to thereby energize the motor 24, at least periodically, to correct the setting of the variable transformer 21, so that the blower motor 12 operates at exactly the right velocity to achieve a truly constant flow of air across the filter 16. This constant flow is taken with respect to a constant temperature, as is required for a majority of applications employing constant-flow systems. In this manner, then, the air flow across the filter of the system hereof is actually constant to the extent that impurities per unit volume thereof, for example, may be compared to each other over a considerable period of time, despite the fact that variations in air-discharge temperature occur. Although it might be considered that the change in air temperature is only a minor factor, experimentation has shown that this is not the case. In contrast to conventional constant air flow systems, the present invention is found to have a constancy which is 3 to 5 times as great. Thus, instead of regulating air flow within 8 to 10 percent, as is actually achieved with the majority of conventional systems, the present invention provides regulation within 1 to 2 percent.

Figure 2:
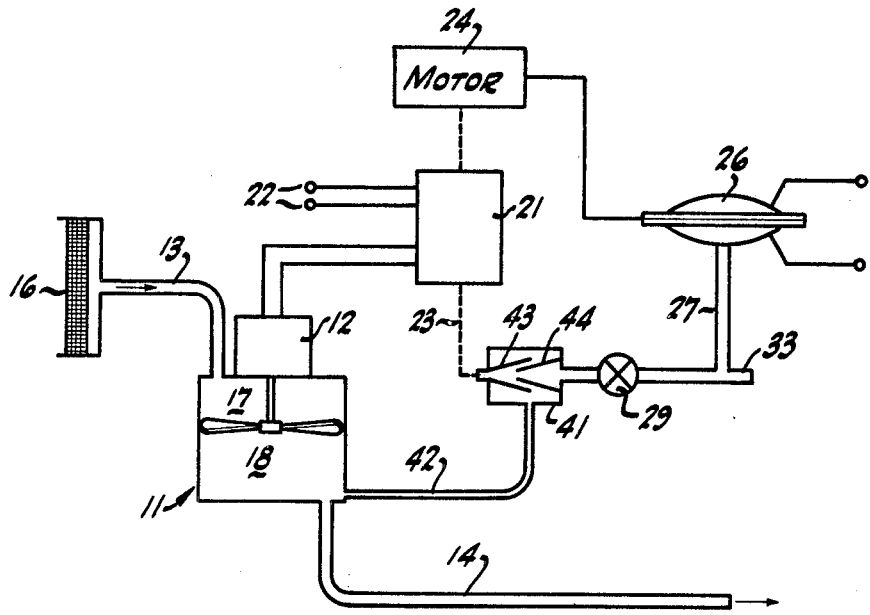
FIGURE 2 is a schematic illustration of an alternative embodiment of a compensated constant-flow system in accordance with the present invention.

An alternative embodiment of the present invention is illustrated in FIGURE 2 wherein the same elements as shown in FIGURE 1 are identified by the same numerals. It will be seen that the basic system is the same as that described and illustrated above, in that it incorporates a blower 11 operated by a motor 12 and having an inlet line 13 drawing air, or the like, through a filter 16 and discharging such air through an outlet line 14. The blower motor 12 is energized through a variable transformer, or the like 21 from power-supply terminals 22, and this unit 21 is, in turn, controlled by a reversible motor 24 operated from a pressure-sensitive switch 26. In this particular embodiment, however, a valve 41 is illustrated to be connected between the outlet of the blower and the inlet line 27 of the pressure-sensitive switch 26. This valve 41 is quite similar to the valve 28 of FIGURE 21 except that it is alternatively operated. A small conduit, or the like, 42 is shown to extend from the outlet chamber 18 of the blower to the valve 41 which may include therein a pair of mating conical elements 43 and 44, as shown. Of course, alternative interior configurations of the valve may be employed, but, as shown, the cone 43 is movable axially thereof and axially of the output cone 44 which has both ends open. Air flow thus passes from the inlet line 42 between the two conical elements 43 and 44 and out the base of the fixed cone 44. Movement of the cone 43 will thus be seen to vary the restriction between the cones, and, consequently, resistance to pressure flow through the valve.

In this embodiment of the present invention as illustrated in FIGURE 2, control over pressure drop in the valve 41 is accomplished from the control motor 24 by the shaft 23 extending therefrom to the variable transformer 21. Mechanical interconnection of the movable portion of the valve 41 and the reversible motor 24 may take a variety of forms such as, for example, a cam arrangement illustrated in FIGURE 4. Aside from details of the mechanical interconnection, it is noted that this embodiment of the invention operates upon the basis of varying the pressure drop in the valve 41 as a function of variation in speed of the blower. Increased blower speed raises the temperature of discharged air to thereby increase the pressure thereof greater than the increase in flow rate. Consequently, in the embodiment of FIGURE 2, it is provided that an increase in blower speed shall at the same time cause an increase in pressure drop across the valve 41, so that the increase in pressure from increasing temperature is compensated for at the switch 26. Thus the embodiment of FIGURE 2 will be seen to provide for full and complete control over air flow, despite passage of such air through an element such as a filter having a variable resistance to air flow. Not only does the system provide for regulation to compensate for the external factor of varying air flow resistance, but also the system compensates for internal changes in conditions which would otherwise affect the true volume of air flow.

Figure 4:
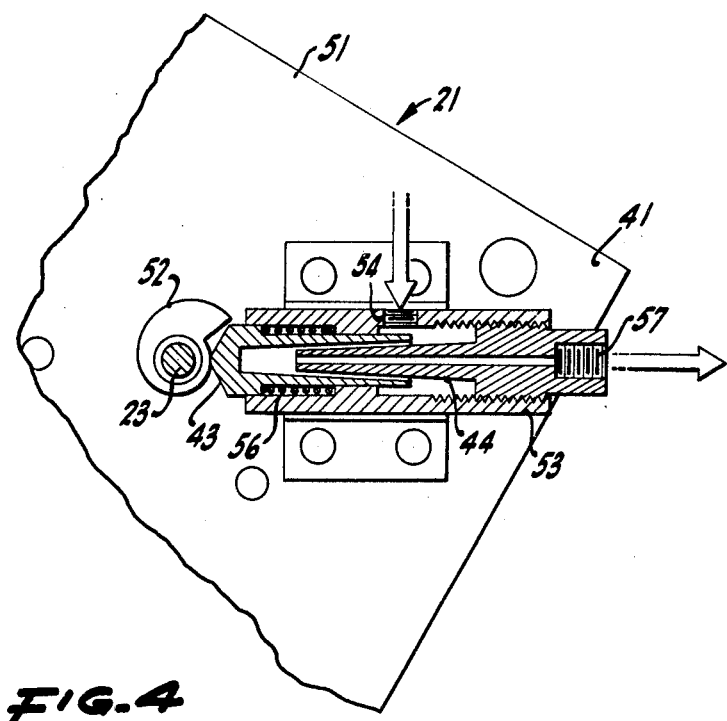
FIGURE 4 is an illustration of mechanical details of control-valve actuation and structure partially in section, as shown.

While it is possible, as noted above, to form various elements of the present invention in a variety of different ways, it is noted that the control valve 41 of FIGURE 2 may, for example, be directly mounted upon unit 21 for cam actuation from a control shaft 23. Such shaft 23 may be common to both the reversible motor 24 and to the variable transformer 21, or the shafts of these two units may be coupled together. Referring to FIGURE 4, there will be seen to be illustrated a practical mechanical configuration actually employed in a commercial model of the present invention formed in accordance with the illustration of FIGURE 2. The valve 41 is shown to be mounted upon the base 51 of the variable transformer, or variable resistor, 21. The shaft 23 of this variable transformer is shown to extend through the base and to carry a cam 52 thereon. The valve 41 is illustrated as comprising a housing 53 having an opening 54 therein for attachment of the pressure line 42 and having the movable conical element 43 slideably disposed within such housing with the outer end thereof bearing upon the surface of cam 52. A small helical spring 56 urges this conical element 43 outwardly of the housing into engagement with the cam. The other conical element 44 of the valve is shown to be threaded into the housing for initial adjustment of the spacing between the two conical elements, and to have a central opening 57 therethrough for connection to the outlet line of the valve leading to the inlet line 27 of the pressure-sensitive switch 26. Thus, it will be seen that with counterclockwise rotation of the control shaft 23 by the motor 24 for the purpose of increasing energization of the blower motor, there will be produced a rotation of the cam 52 on this shaft. Because of the particular cam configuration, initial increase in blower energization will cause substantially no change in the setting of valve 41; however, as the blower speed is materially increased so as to substantially increase air loss therein and increase the temperature of air exhausted therefrom, the increasing cam diameter operates to move the conical element 43 inwardly of the valve housing, so as to approach the other conical member 44 more closely and reduce the size of the air passage through the valve. This, then, increases pressure drop through the valve, so that the pressure-sensitive switch 26 receives a decreased pressure signal to compensate for the increasing temperature of the air exhausted by the blower. The above-described mechanical structure of FIGURE 4 is presented only as an example of one possible mechanical interconnection of elements of the system hereof and various others are clearly possible.

Figure 3:
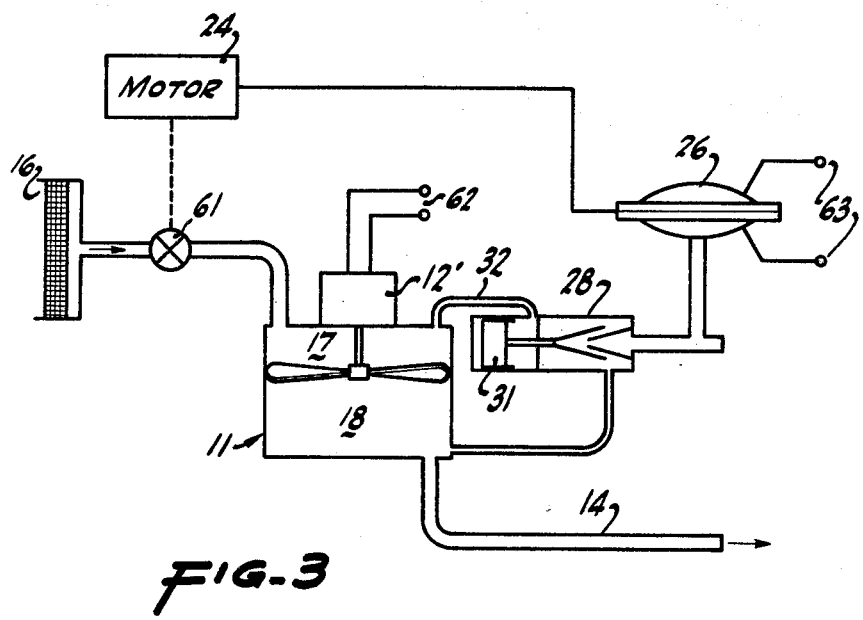
FIGURE 3 is a schematic illustration of yet another embodiment of the compensated constant-flow system of the present invention.

For at least certain applications of the present invention, it is possible to employ an alternative embodiment thereof, such as illustrated in FIGURE 3 of the drawing. Again in this illustration, elements of the system which are identical to those of FIGURE 1 are identified by the same numerals. In common with the above-described embodiments of this invention, the system of FIGURE 3 incorporates a blower 11 having an inlet, or suction line 13 and a discharge line 14. A filter 16 is provided in the suction line 13 or removing particles from air or gas drawn into the blower; however, in this embodiment there is additionally provided a motor-driven valve 61 located in the inlet line 13 of the blower. This particular system of FIGURE 3 operates in a somewhat different manner from the embodiments of the invention described above; in this respect, it is noted that the blower is operated by a constant-speed motor 12'. This motor may be energized from power-supply terminals 62, as shown. The inlet valve 61 is operated by a control motor 24 mechanically interconnected to the valve 61, as schematically illustrated by the dashed line therebetween. Operation of the control motor 24 is accomplished from a pressure-sensitive switch 26 having electrical contacts connected between a power-supply terminal 63 and the motor 24. Insofar as operation of the pressure-sensitive switch 26 is concerned, substantially the same arrangement as that illustrated in FIGURE 1 may be employed, in that a variable-flow impedance 28 is connected between the blower-discharge line 14 and the pressure-sensitive switch 26. This element 28, which may be denominated as a valve, is shown to be actuated by a piston 31 operated from the inlet side 17 of the blower, so as to open or close in accordance with the pressure changes therein for varying pressure drop across the valve 28.

With regard to operation of the embodiment of the invention illustrated in FIGURE 3, it is noted that the constant-speed motor 12' of the blower is set to drive the blower at a rate sufficient to discharge a desired flow of air from the blower at maximum clogging, or pressure drop, across the filter 16. Initially, the inlet valve 61, between the filter and blower, is adjusted to provide a substantial pressure drop thereacross so, with substantially no pressure drop across the filter, the blower will be discharging the desired flow of air or other gas. As the filter collects particles from the gas, or fluid, passing therethrough and thus increases pressure drop thereacross, the discharge pressure of the blower drops. This reduces the pressure applied to the pressure-sensitive switch 26 to thereby energize the drive motor 24 for slowly opening the inlet valve 61 to decrease the pressure drop thereacross. Consequently, as the pressure drop across the filter increases, the pressure drop across the inlet valve decreases and an equilibrium condition is attained whereby a constant volume of air is discharged from the system through the discharge line 14. Although it might be considered that with this particular system there would be no problem of variation in air temperature, it has been found that substantial loading of the blower results in the dissipation of heat in the air passed thereby. Consequently the system of this embodiment does provide a control responsive to inlet air pressure to thereby compensate for variation in discharge air temperature.

There has been described above a number of preferred embodiments of the present invention, and it is to be noted that each of the constant air flow systems of this invention operates upon the pressure of moving air. Thus, the control valve 28 of the embodiment of FIGURE 1, for example, operates to introduce a controllably variable pressure drop in a control line to the pressure-sensitive switch 26. If the system were operating upon a static pressure, this valve would not introduce the requisite compensating pressure change, but it will be noted than in each of the embodiments of the present invention an air flow is provided from the discharge line through a compensating control element, or valve, to the pressure-sensitive switch 26 and to a bleed-off. Consequently, then, it is a flow of air, or other fluid, which is employed herein to achieve the requisite regulation. It is here again emphasized that the present invention not only operates to compensate for a varying pressure drop in a conduit, as may result from a filter therein, but, also, serves to compensate for differences in a resultant air flow caused by the first mentioned compensation. The invention therefore precedes an entire order of magnitude beyond conventional constant air flow systems. It will, of course, be appreciated that more complex control systems may be devised to achieve results similar to that of the present invention. Inasmuch as the invention is directed not only to maintaining a constant air flow but also to insuring the constancy being related to a constant temperature, it would naturally be possible to employ temperature-sensing control means in the discharge line. It has been found, however, that such systems are unduly complex, are generally of a relatively fragile nature and in at least many instances do not meet the accuracy requirements for many applications.

There is provided by the present invention an extremely simple and rugged system which is applicable not only to laboratory use but also to field use. The present invention is particularly well adapted to operation under highly adverse circumstances and conditions with wholly untrained personnel without the requirement of maintenance or repair for long periods of uninterrupted operation. One embodiment of the present invention is designed to convert most existing high-volume air samplers to constant-flow operation. This particular unit provides a constant-flow rate of 5 to 50 cubic feet per minute which is adjustable at the unit and accomplishes this with an accuracy of a plus or minus 2 percent of the setting. This unit weighs only 20 pounds with an overall cabinet size of 9 inches wide, 11½ inches long and 7 inches high, while being operable from a conventional 115 volt, 60 cycle 10 amp power source. It will thus be appreciated that the present invention does provide a material improvement in the art of constant-flow regulators.

That which is claimed is:

1. An improved constant-flow system for drawing fluid through a filter having a variable resistance to fluid flow and comprising a fluid pump including a variable speed drive motor and having an inlet connected to said variable filter resistance and an outlet,
a control motor connected to said pump drive motor for varying the rate of fluid flow,
a pressure-sensitive switch connected in an energizing circuit of said control motor,
piping means connecting said pump outlet to said pressure-sensitive switch for switch actuation by pump outlet pressure, and
control means disposed in said piping means and having a variable opening therein varying in relation to pump loading defined by a valve connected between said pressure-sensitive switch and said pump outlet, and means connecting said valve and said control motor for varying the valve opening in relation to pump-drive motor energization, 2. The system of claim 1 further defined by said control motor having a shaft with a cam thereon, and said valve having a spring-loaded movable element varying valve opening and bearing upon said cam.

3. An improved constant flow system for drawing fluid through a filter having a variable resistance to fluid flow and comprising a fluid pump having an inlet connected to said filter and a discharge, said pump being driven by a variable speed motor,
a variable impedance connected in circuit with said pump drive motor for varying the speed thereof,
a reversible motor having a shaft connected to said variable impedance for varying the value thereof,
a pressure responsive switch connected in circuit with said reversible motor for controlling motor energization, and
a valve connected between said pump discharge and said pressure-sensitive switch and having a movable valve element connected to said reversible motor shaft for varying valve opening by control motor operation.

References Cited

UNITED STATES PATENTS

| | | | |
|---|---|---|---|
| 1,419,316 | 6/1922 | Sherbondy | 230—12 |
| 1,713,833 | 5/1929 | Kochendorfer | 137—486 |
| 1,840,253 | 1/1932 | Richardson. | |
| 1,910,202 | 5/1933 | Crago | 230—12 |
| 2,189,895 | 2/1940 | Grutzner | 55—210 |
| 2,349,521 | 5/1944 | Schmidt | 137—486 |
| 2,439,239 | 4/1948 | Crever | 230—12 |
| 2,616,514 | 11/1952 | Shobe | 55—21 |
| 2,646,932 | 7/1953 | Frost | 137—487.5 |
| 2,819,774 | 1/1958 | Schmidt et al. | 55—270 |
| 3,195,552 | 1/1964 | Thomann | 230—12 |

HARRY B. THORNTON, Primary Examiner

B. KONICK, Assistant Examiner

U.S. Cl. X.R.

55—270, 417, 467; 137—36, 37, 487.5; 230—12